(12) United States Patent
Kerr et al.

(10) Patent No.: US 8,295,294 B2
(45) Date of Patent: *Oct. 23, 2012

(54) DYNAMIC BANDWIDTH ALLOCATION

(75) Inventors: Jade Kerr, Kansas City, MO (US);
Andrew Cook, Lenexa, KS (US); Mike Morrissey, Overland Park, KS (US);
Clinton Smoyer, Raymore, MO (US);
Mohit Mathur, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 100 days.

This patent is subject to a terminal disclaimer.

(21) Appl. No.: 12/839,796

(22) Filed: Jul. 20, 2010

(65) Prior Publication Data

US 2010/0280934 A1      Nov. 4, 2010

Related U.S. Application Data

(63) Continuation of application No. 12/168,327, filed on Jul. 7, 2008, now Pat. No. 7,782,884.

(51) Int. Cl.
*H04L 12/28* (2006.01)
(52) U.S. Cl. ........................................................ 370/401
(58) Field of Classification Search .......... 370/352–356, 370/401; 379/114.03, 114.06–114.09
See application file for complete search history.

(56) References Cited

U.S. PATENT DOCUMENTS

| | | | |
|---|---|---|---|
| 7,698,432 B2 * | 4/2010 | Short et al. | 709/226 |
| 7,725,338 B1 * | 5/2010 | Wong | 705/7.11 |
| 2002/0021678 A1 * | 2/2002 | Heatwole et al. | 370/325 |
| 2007/0291765 A1 * | 12/2007 | Boley et al. | 370/395.21 |

* cited by examiner

*Primary Examiner* — Frank Duong
(74) *Attorney, Agent, or Firm* — Patton Boggs LLP

(57) ABSTRACT

A method for managing bandwidth to a user. A selection of a profile is received from a plurality of profiles. The profile is selected to allocate bandwidth to a user. The selection of the profile for allocating bandwidth to the user through a connection is determined. The bandwidth is allocated to the connection in response to determining the profile provides for a bandwidth reconfiguration.

20 Claims, 6 Drawing Sheets

FIG. 6

| Ethernet Interface | | 600 |
|---|---|---|
| Time of day profiles | Cost | |
| ☑ Profile 1<br>00:00 – 23:59: Default Setting<br>Standard 10 Mbps during this ToD profile | None | 602 |
| ☐ Profile 2<br>00:00 – 07:59: Off-Peak<br>Increased to 20 Mbps during this ToD profile | Standard + $15 | 604 |
| ☑ Profile 3<br>18:00 – 23:59: Non-Peak<br>Increased to 15 Mbps during this ToD profile | Standard + $8 | 606 |
| ☐ Profile 4<br>2:00 – 07:30: Non-Peak<br>Increased to 15 Mbps during this ToD profile | Standard + $10 | 608 |

DYNAMIC BANDWIDTH ALLOCATION

CROSS-REFERENCE TO RELATED PATENT APPLICATIONS

This patent application is a continuation of U.S. patent application Ser. No. 12/168,327, filed Jul. 7, 2008 now U.S. Pat. No. 7,782,884 and entitled: SYSTEM AND METHOD FOR ADJUSTING BANDWIDTH BASED ON A TIME OF DAY PROFILE, which is incorporated herein by reference.

BACKGROUND OF THE INVENTION

Description of the Related Art

The use of and development of communications has grown nearly exponentially in recent years. The growth is fueled by larger networks with more reliable protocols and better communications hardware available to service providers and consumers.

Despite the many technological advances, most users of communications services are still limited by traditional service plans. In particular, users are commonly charged a flat rate for data services, such as a specified or guaranteed amount of bandwidth. The bandwidth provided by the communications service provider may limit the user's activities or ineffectively utilize the communication service provider's network and available bandwidth. Current systems and services may be inefficient for both the user and the communications service provider.

BRIEF SUMMARY OF THE INVENTION

One embodiment provides a system and method for managing bandwidth to a user. A selection of a profile may be received from a plurality of profiles. The profile may be selected to allocate bandwidth to a user. The selection of the profile for allocating bandwidth to the user through a connection may be determined. The bandwidth may be allocated to the connection in response to determining the profile provides for a bandwidth reconfiguration.

Another embodiment provides a network edge device for managing bandwidth to one or more users. The network edge device may include a clock operable to determine a current time. The network edge device may also include a bandwidth controller operable to determine whether the bandwidth available to a user is to be adjusted based on the current time and a profile. The bandwidth controller may be operable to issue a command to adjust the bandwidth in response to the determination. The network edge device may also include an access circuit for adjusting the bandwidth available to the user through a connection in response to the command. The network edge device may also include cost logic operable to determine costs incurred by the user in response to the profile implemented by the bandwidth controller.

Yet another embodiment provides a network device for adjusting bandwidth. The network device may include a processor for executing a set of instructions and a memory in communication with the processor. The memory may be operable to store the set of instructions. The set of instructions may be operable to receive a selection of a profile from a plurality of profiles, the profile being selected to allocate bandwidth to a user, determine the selected profile for allocating bandwidth to the user through a connection, allocate the bandwidth available to the connection in response to determining the selected profile provides for a bandwidth reconfiguration, and track implementation of each of the plurality of profiles during a time period to bill the user for the bandwidth utilized during the time period.

BRIEF DESCRIPTION OF THE DRAWINGS

Illustrative embodiments of the present invention are described in detail below with reference to the attached drawing figures, which are incorporated by reference herein and wherein:

FIG. 6 is an interface for selecting a time of day profile in accordance with an illustrative embodiment.

DETAILED DESCRIPTION OF THE INVENTION

The illustrative embodiments provide a system and method for dynamically adjusting the bandwidth available to a user. In one embodiment, the user may select from multiple time of day profiles to increase the available bandwidth for an additional fee. In particular, the user may select at any time to expand bandwidth received during off-peak or non-peak hours for a small service cost. The additional bandwidth may be utilized to perform network intensive tasks, such as back-ups, large downloads or uploads, synchronization between offices, devices, servers or other systems, and batch transmission or receipt jobs. Any number of descriptions, classifications or ratings may be used to describe utilization or availability of data services, such as peak, non-peak, and off-peak. For example, peak hours may represent maximum network traffic, non-peak hours may specify network usage between 40 and 70 percent, and off-peak hours may specify network utilization less than 40 percent. However, any number of criteria or thresholds may be utilized to classify network utilization.

Figure 1:
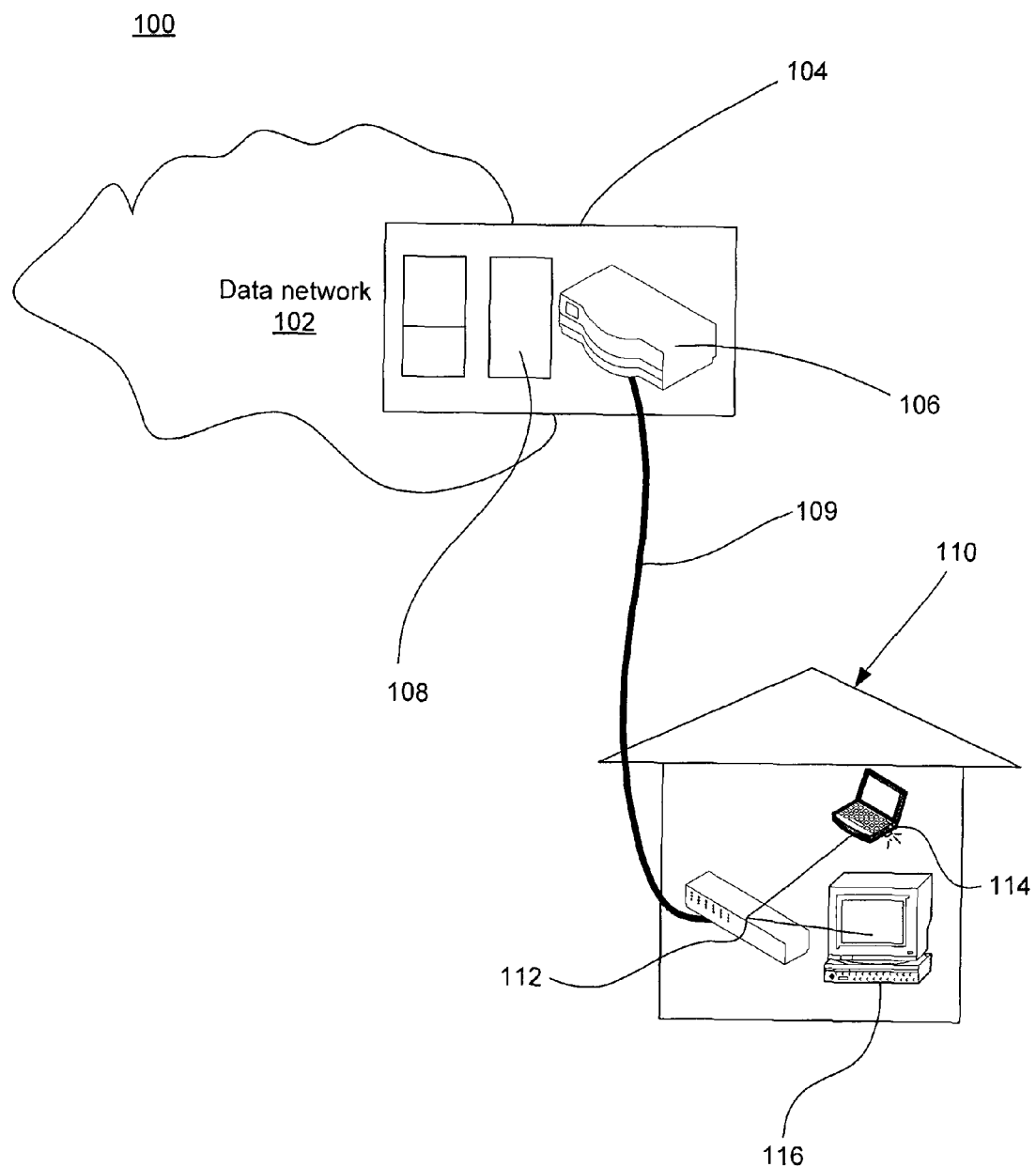
FIG. 1 is a pictorial representation of a communications environment in accordance with an illustrative embodiment.

FIG. 1 is a pictorial representation of a communications environment 100 in accordance with an illustrative embodiment. The communications environment 100 of FIG. 1 is the system, environment, devices, and settings utilized for data communications. In one embodiment, the communications environment 100 may include a data network 102, a communications management system 104, including a network edge device 106, and a utilization server 108, connection 109, a customer 110, a router 112, and clients 114 and 116.

The data network 102 is a network and system for communicating data, packets, and other information between any number of points, individual users, businesses, organizations or other communicating parties. The data network 102 may be provided by a communications service provider. The communications service provider may provide data services for multiple users or customers which may include the customer 110. The data network 102 may include any number of devices, physical connections, elements or wireless systems in addition to the communications management system 104, network edge device 106, and utilization server 108.

In one embodiment, the data network 102 may provide any number of data services, including Internet Protcol (IP), Ethernet, digital subscriber line (DSL), ATM, Frame Relay, data over cable service interface specifications (DOCSIS) or other similar data connections for users registered to receive the service. The communications management system 104 is the device or network elements that manages communications for all or a part of the data network 102. The communications management system 104 may include any number of switches, servers, routers, databases, processing systems, and other elements utilized to enable data communications for the customer 110. As illustrated herein, the communications management system 104 includes the network edge device 106 and the utilization server 108.

The network edge device 106 is the last device or element that is integrated with the data network 102 before connecting to a device or element utilized by a user shown as the customer 110 in FIG. 1. The network edge device 106 is positioned on the outer-most part of the data network 102 to manage bandwidth utilized or available to the customer 110. The network edge device 106 may be one or more servers, routers, switches or intelligent network devices managing data flow to the customer 110. However, the network edge device 106 may be any device suitable for managing communications between a data network 102 provided by a communications service provider and the user as represented by the elements of the customer 110.

The network edge device 106 may store one or more time of day profiles for controlling the bandwidth available to the customer 110 through the router 112. In one embodiment, the customer 110 may select any number of compatible time of day profiles to be stored in the network edge device 106 for implementation.

The utilization server 108 is a server configured to track the time of day profiles utilized by the customer 110. In one embodiment, the customer 110 may select the time of day profile or one or more profiles to be stored in the network edge device 106 and the utilization server 108. In addition to any number of other software or hardware elements, the utilization server 108 tracks the additional costs for selecting a time of day profile with expanded bandwidth available during non-peak and off-peak hours. In another embodiment, the customer 110 may pay for 50 Mb of bandwidth available to the clients 114 and 116 through the router 112 from the hours of 6:00 AM to 10:00 PM. The customer 110 may select to add a time of day profile that expands the bandwidth available through the router to 100 Mb per second from 10:00 PM to 6:00 AM. The customer 110 may utilize the additional bandwidth to send batch information, perform system updates, backup information or otherwise utilize the bandwidth. In another embodiment, a database in communication with the utilization server 108 may store the selection of a time of day profile for implementation by the network edge device 106. The utilization server 108 may be connected to any number of billing databases, web servers or other invoice or billing applications or systems in order to bill the customer 110 for the increased bandwidth available through the connection 109.

The customer 110 is a user of the communications service provider operating the data network 102. The customer 110 may also be an individual, family, organization, group or other data services customer. The customer 110 may be housed in one or more buildings and may receive all data communications through the router 112.

The router 112 is a device configured to route data communications to the clients 114 and 116. However, the router 112 may be a server, wireless network device or other element suitable for receiving and routing communications to the clients 114 and 116. In one embodiment, the router 112 may be a WiFi® router configured to communicate with the clients using a wireless standard or proprietary protocol. In another embodiment, the router 112 may be an integrated portion of a local area network utilized by the customer 110.

The clients 114 and 116 are communications or computing devices operable to send and receive data communications. The clients 114 and 116 represent any number of devices or elements that may communicate through the connection 109. For example, the clients 114 and 116 may include: laptops, personal computers, servers, wireless devices, PDAs, Blackberry®, voice over IP telephones or other similar communications devices.

The connection 109 is a data connection between the customer 110 and the data network 102. For example, the connection 109 may provide the customer 110 access to the Internet, any number of local area networks, private networks, virtual private networks, networks, devices or other communications service providers available through the connection 109. The connection 109 may be physically represented by a fiber optic connection, category 6 cable, coaxial cable, telephone line, wireless network or other communications line connecting the network edge device 106 and the router 112 which may include both large-scale and small-scale connections.

Figure 2:
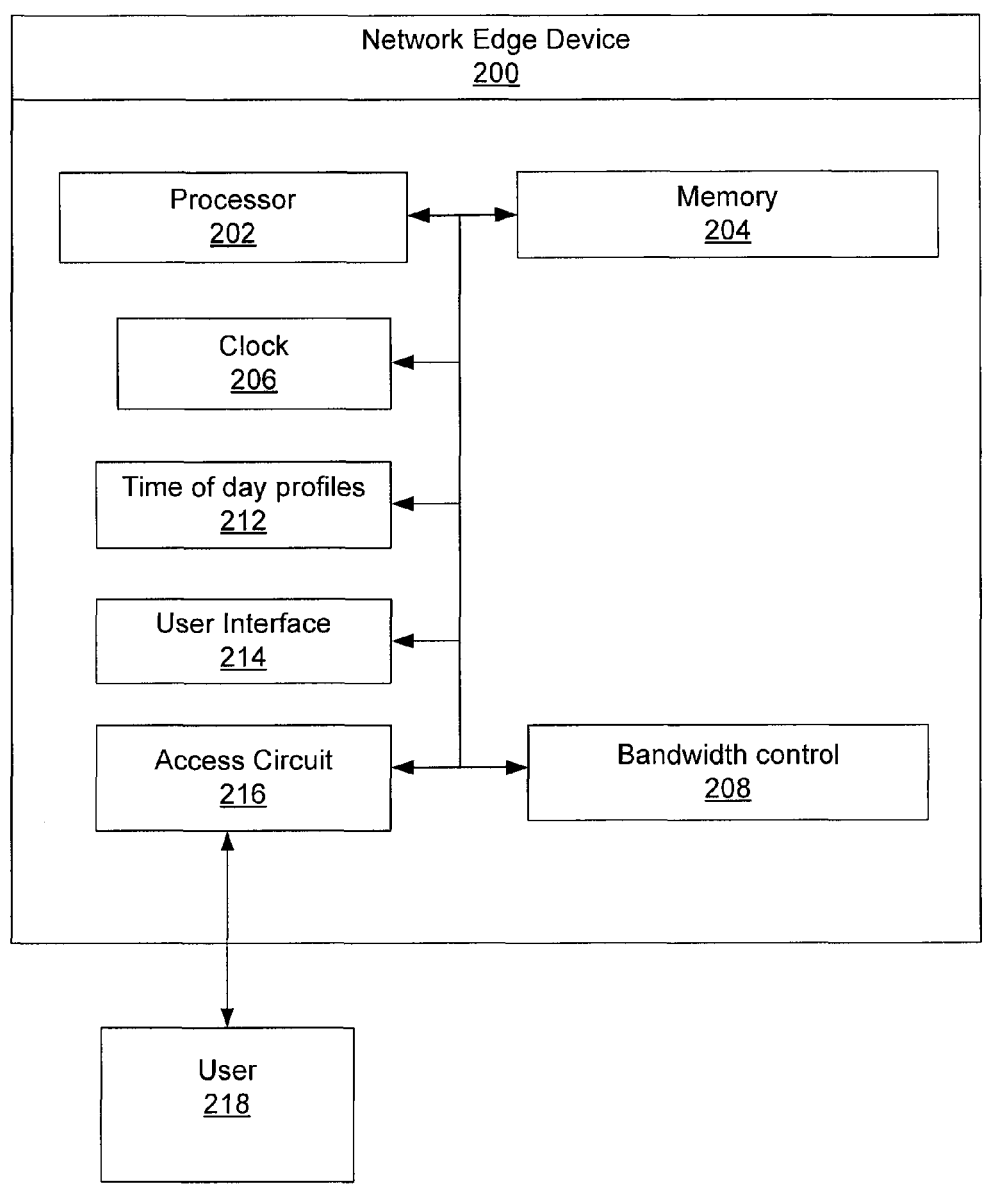
FIG. 2 is a block diagram of a network edge device in accordance with an illustrative embodiment.

FIG. 2 is a block diagram of a network edge device 200 in accordance with an illustrative embodiment. The network edge device 200 and the user 218 are particular implementations of the network edge device 106 and the customer 110 of FIG. 1, respectively. The network edge device 200 may include any number of hardware, software, and firmware elements which may include a processor 202, a memory 204, a clock 206, a bandwidth control 208, time of day profiles 212, a user interface 214, and an access circuit 216. The network edge device 200 may manage bandwidth and communications for one or more individuals, groups, organizations or businesses, including a user 218.

The processor 202 is circuitry or logic enabled to control execution of a set of instructions. The processor 202 may be a microprocessor, digital signal processor, central processing unit or other device suitable for controlling an electronic device including one or more hardware and software elements, executing software, instructions, programs and applications, converting and processing signals and information, and performing other related tasks. The different elements of the network edge device 200 may be integrated or communicated through leads, wires, busses, sockets, cards or other interfaces. The processor 202 may be a single chip or integrated with other computing or communications elements. In one embodiment, the processor 202 may function with the bandwidth 208 control to manage the available bandwidth allotted to the user 218 through the access circuit.

The memory 204 is a hardware element, device or recording media configured to store data for subsequent retrieval or access at a later time. The memory 204 may be static or dynamic memory. The memory 204 may include a hard disk, random access memory, cache, removable media drive, mass storage or configuration suitable as storage for data, instructions, and information. In one embodiment, the memory 204 and processor 202 may be integrated. The memory may use any type of volatile or non-volatile storage techniques and mediums. In one embodiment, the memory 204 may store the current selection of a time of day profile.

The clock 206 is a device or software module for tracking and measuring the current time. In one embodiment, the clock 206 is a stratum clock that directly or indirectly receives a time signal indicating the current time from the United States Naval Observatory or equivalent organization. The clock 206 may be enabled to synchronize the current time with one or more other timekeeping elements or clocks. Additionally, the clock 206 may keep and track the current time independently for purposes of autonomy or as needed. The clock 206 may be important because the different time of day profiles 212 may be initiated to increase or decrease the available bandwidth based on the current time read by the clock 206.

The time of day profiles 212 is information that controls a bandwidth available to the user 218 based on the time of day measured by the clock 206. The time of day profiles 212 may include any number of profiles or settings that may be selected by the user 218 and implemented by the network edge device 200. For example, the user 218 may select to increase the bandwidth available from 250 Mb to 750 Mbps from 2:00 AM to 7:00 AM for a increased cost of $10.00 per day. The increased bandwidth during this time may be used by the user 218 to perform system updates, backups or other bandwidth intensive processes or functions.

In one embodiment, the user 218 may utilize another network device in communication with the network edge device 200 in order to make the selection of the time of day profiles 212 and receive the related cost or billing information. In one embodiment, the user interface 214 may allow the user 218 to update one or more of the time of day profiles 212 via cell phone. In another embodiment, the user 218 may communicate with a billing database through a web server that allows the user 218 to upgrade the time of day profiles 212 selected for implementation by the network edge device 200 using a network connection.

The user interface 214 is an interface for receiving user input. The user interface 214 may be a graphical user interface (GUI), interactive voice response system, web page or other interface element or devices. The user interface 214 may be accessible using a user name, password, account number or any other identifiers that allow the user 218 to authenticate the changes made to the time of day profiles 212. The user interface 214 may be available through any number of computing or telecommunications devices, including personal computers, servers, laptops, routers, wireless devices, virtual tunnels, modules or other elements. The user interface 214 may allow the user 218 to select or change a time of day profile at any time. For example, based on the user's needs, a time of day profile may be immediately selected and initiated. The user 218 may be charged for the time of day profile on an hourly, daily or monthly basis. For example, the user may be charged for the increased expense for a time of day profile by prorating the costs for the time period the time of day profile is selected. Alternatively, the time of day profile may be charged in day or month increments.

The bandwidth control 208 or controller is the logic or circuitry for controlling the bandwidth allocated to the user 218. In one embodiment, the bandwidth control 208 sends commands to the access circuit 216. The access circuit 216 is the logic and circuitry that increases or decreases the bandwidth allocated to the user 218. The access circuit 216 may be connected to the user 218 through a communication line or link. In one embodiment, the data information and packets communicated by the user 218 are channeled through the access circuit 216.

The clock 206, bandwidth control 208, time of day profiles 212, user interface 214, and access circuit 216 may be implemented as software modules, digital logic, firmware or hardware within or external to the network edge device 200 in order to manage, control, and physically allocate the bandwidth available to the user 218.

The access circuit 216 may utilize any number of physical layer access methods to allocate the bandwidth through one or more circuits, connections or other devices. For example, the access circuit 216 may utilize TCP/IP protocols to send and receive data with the user 218. However, any standards or protocols available for data communication may be utilized between the access circuit 216 and the user 218. As previously described, information received from the user 218 may be routed through the access circuit 216 to any number of other network devices, trunks, communications lines or other users.

Figure 3:
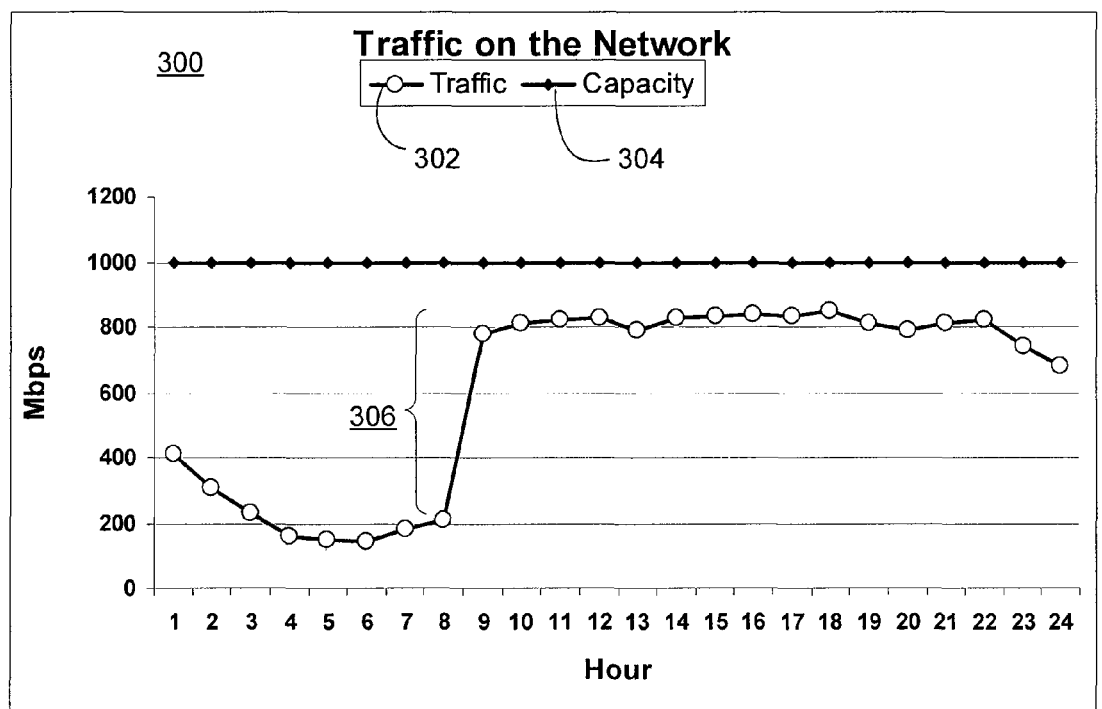
FIG. 3 is an illustrative chart of available bandwidth compared with utilized bandwidth in accordance with an illustrative embodiment.

FIG. 3 is an illustrative chart of available bandwidth compared with utilized bandwidth in accordance with an illustrative embodiment. FIG. 3 shows a chart 300 that may include various statistical and graphical elements which includes traffic 302, capacity 304, and available bandwidth 306.

The chart 300 may be utilized by a communications service provider in order to represent traffic 302 on one or more of the service provider's networks. As shown, the X axis of the chart 300 represents the hours of the day and the time measurement. The Y axis represents the bandwidth in megabytes per second utilized on the network.

The capacity 304 is the capacity available on the network. The capacity 304 may represent various theoretical, practical or functional limitations for the communications service provider and the communications service provider's customers and users.

The traffic 302 is the actual usage of the network as measured hour by hour or second by second in megabytes per second. The chart 300 is representative of the network traffic and network capacity available to many communications service providers. It is important to note that between the hours of 11:00 PM and 8:00 AM, the traffic 302 decreases substantially to a low point at approximately 5:00 AM. In other words, during this time period the network may be said to be under utilized as indicated by the available bandwidth 306.

The available bandwidth 306 indicates bandwidth that may be used for data communications. As a result, the communications service provider may offer one or more time of day profiles in order to increase the traffic 302 and more effectively utilize the available bandwidth 306. For example, from 10:00 PM or 2200 hours, military time, to 2:00 AM may be considered an non-peak time. When the network is not being fully utilized, the time period from 2:00 AM to approximately 8:00 AM may be considered as off-peak times during which the network is minimally utilized. As a result, the communications service provider may for a small increase in costs or fees allow a user to have expanded bandwidth from 11:00 PM to 2:00 AM as a non-peak time. For example for an additional $20.00 per month, the user's bandwidth may be expanded from 50 Mbps to 100 Mbps.

Additionally, the user may be able to select a profile from 2:00 AM to 8:00 AM that triples the bandwidth available during that time for an additional $20.00 per month by selecting a time of day profile. Each of the time of day profiles or both may be purchased or selected by the user. For example if the user selected both profiles, the user would incur the additional cost of $40.00 per month for double the bandwidth during non-peak times and triple the bandwidth during off-peak times.

The expanded time of day profile may allow the communications service provider to more effectively utilize the available bandwidth 306 and further increase profit margins and user satisfaction with the services and customization available. The communications service provider may more effectively use communications lines and equipment that is already purchased, leased or otherwise included as an operating expense to increase profits and provide additional alternatives to enhance user satisfaction with the data services provided by the communications service provider.

Figure 4:
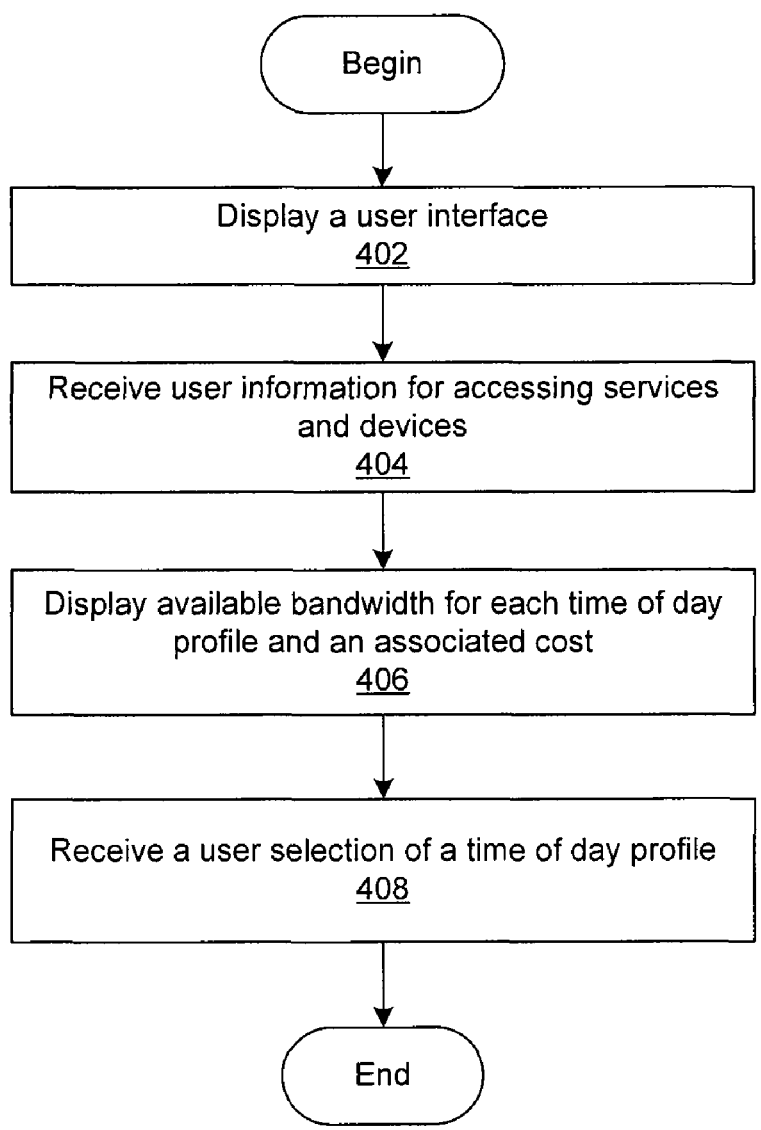
FIG. 4 is a flowchart of a process for establishing a time of day profile in accordance with an illustrative embodiment.

FIG. 4 is a flowchart of a process for establishing a time of day profile in accordance with an illustrative embodiment. The process of FIG. 4 may be implemented by a network device for receiving time of day profiles. In one embodiment, the network device may be a billing or utility server in communication with one or more user databases, billing databases, and other similar systems and devices.

The process may begin with the network device displaying a user interface (step 402). The interface may be provided through a website, wireless device or other element. In one embodiment, the user interface is a portal generated by a web server operated by the communications service provider.

Next, the network device receives user information for accessing services and devices (step 404). The user information may include authentication information, such as a user name, password, account number or other identifying information. The user information may validate that the user is authorized to configure the services and devices that may be configured through the user interface.

Next, the network device displays available bandwidth for each time of day profile and an associated cost (step 406). The available bandwidth may be displayed to the user based on the amount of bandwidth typically used by the user, network capacity, service level agreements relating to quality of services, dropped packets, device and network connection limitations, and other service guarantees. The associated cost is the price to the user for expanding the bandwidth during the specified time of day. For example, by selecting a particular time of day profile, an additional cost may be incurred.

Next, the network device receives a user selection of a time of day profile (step 408). The user selection may be received at any time. In one embodiment, the cost for implementing a new time of day profile may be prorated for the portion of the month that the time of day profile is selected and implemented for the user. For example, the user may need to perform a number of backups during a particular week of the month. As a result, an administrator authorized by the user may select one or more time of day profiles that may increase bandwidth for the specified time period. The ability to change the time of day profile on an hourly, daily or weekly basis may allow the user to have increased satisfaction with the communications service provider.

Figure 5:
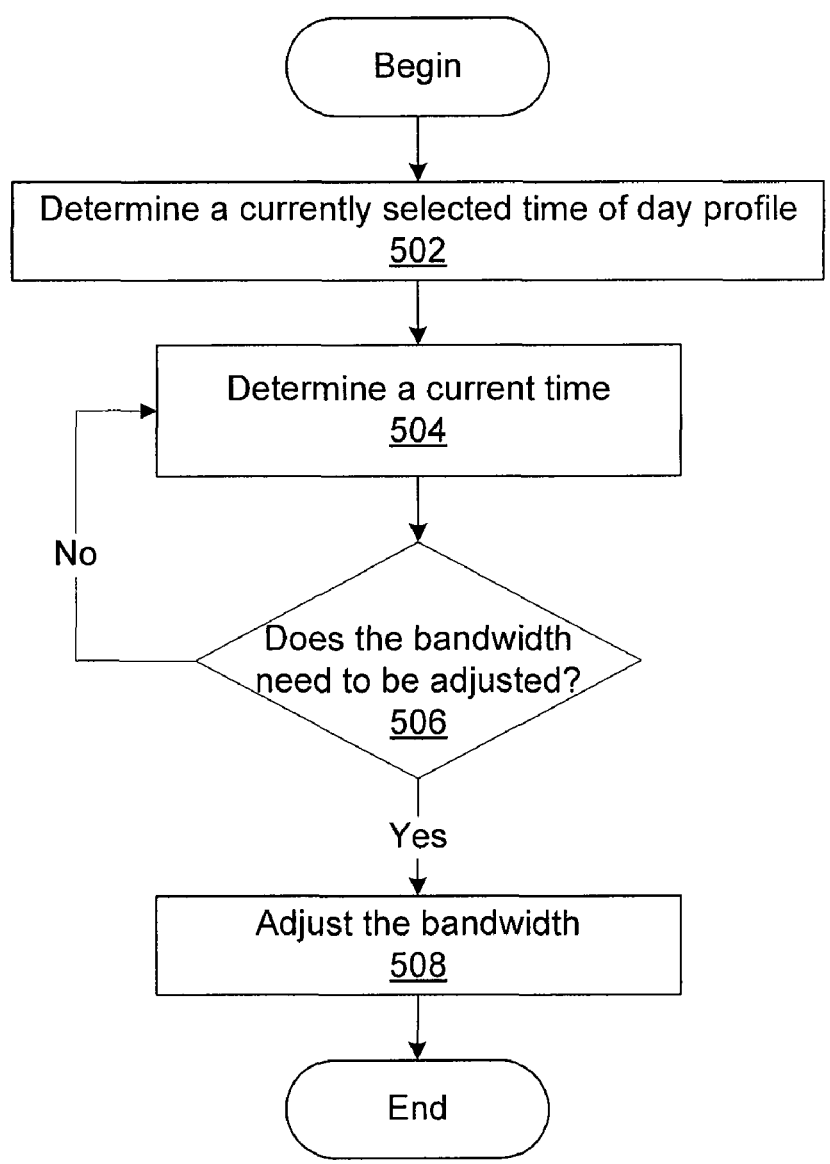
FIG. 5 is a flowchart of a process for adjusted bandwidth to a user in accordance with an illustrative embodiment.

FIG. 5 is a flowchart of a process for adjusted bandwidth to a user in accordance with an illustrative embodiment. The process of FIG. 5 may be implemented by a network edge device. The process may be implemented for any number of users simultaneously in order to take advantage of unused bandwidth available on the communications service provider's network. The process may begin by determining a currently selected time of day profile (step 502). The time of day profile may have been previously elected by the user for implementation.

Next, the network edge device determines a current time (step 504). The current time may be tracked by one or more clocks of the network edge device or may be streamed to the network edge device from an atomic clock, stratus clock or other timekeeping device or network construct.

The network edge device determines whether the bandwidth needs to be adjusted (step 506). The determination of step 506 is made based on the current time and the selected time of day profile. If the bandwidth does not need to be adjusted, the network edge device again determines the current time (step 504).

If the network edge device determines the bandwidth does need to be adjusted in step 506, the network edge device adjusts the bandwidth (step 508). The available bandwidth may be increased or decreased based on the stipulations and criteria of the time of day profile. For example at 2:00 AM, the time of day profile selected by the user may call for a 50% increase in the bandwidth available to the user. However, at 7:30 AM the time of day profile may call for a 50% reduction in the bandwidth allocated to the user. As a result, the bandwidth is adjusted in accordance with the selection made by the user.

FIG. 6 is an interface for selecting a time of day profile in accordance with an illustrative embodiment. The interface 600 is an illustrative embodiment of an interface that may be presented to a user to select one or more time of day profiles. The interface 600 is one example of a graphical user interface. The interface 600 may include sections 602, 604, 606, and 608. The interface 600 may be also used by a user service representative or as a menu that may be audibly played to a user through an interactive voice response system.

As previously described, the interface 600 may be configured to only allow selections of compatible profiles. For example, the profiles of sections 602, 604, 606 may be compatible, whereas the profiles of sections 604 and 608 may not be compatible. The profiles as shown in sections 602, 604, 606, and 608 may show the time period during which the time of profile is activated, the increased change or available bandwidth allocated to the user, and any increased or decreased cost to the user for selecting that time of day profile.

As previously described, the time of day profiles may be selected at any time based on the needs of the user. A selection of a time of day profile may indicate that the user is charged for that time of day profile during the next billing cycle. In another embodiment, the cost of the selected time of day profile may be prorated for the portion of the billing cycle that the user actually utilized that time of day profile.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for managing bandwidth to a user, the method comprising:
   receiving a selection of a profile in a network edge device from a plurality of profiles, the profile being selected to allocate bandwidth to a user;
   determining the selection of the profile for allocating bandwidth to the user through a connection; and
   automatically allocating the bandwidth to the connection through the network edge device in response to determining the profile provides for a bandwidth reconfiguration.

2. The method according to claim 1, further comprising:
   determining a current time, wherein the automatically allocating is performed utilizing bandwidths associated with each time of day in the profile.

3. The method according to claim 1, wherein the automatically allocating includes increasing or decreasing the bandwidth according to the profile or a bandwidth selected by the user.

4. The method according to claim 1, further comprising:
   receiving a selection of one of the plurality of profiles from a user through a portal.

5. The method according to claim 1, further comprising:
implementing the profile in real-time in response to receiving the selection of one of the plurality of profiles with an indication to immediately implement the one of the plurality of profiles.

6. The method according to claim 1, wherein the automatically allocating is performed by an network edge device for the connection, a device, or a network of the user.

7. The method according to claim 1, wherein the profile includes multiple non-conflicting profiles from the plurality of profiles that are active during a twenty four hour period.

8. The method according to claim 1, further comprising:
increasing or decreasing costs charged to a user in response to allocating the bandwidth; and
displaying the costs associated with the plurality of profiles in response to receiving the selection.

9. The method according to claim 8, further comprising:
compiling the costs for a time period according to utilization of each of the plurality of profiles implemented during the time period and the costs associated with each of the plurality of profiles.

10. The method according to claim 9, further comprising:
billing the user for the costs of the bandwidth allocated according to each of the plurality of profiles implemented during a time period.

11. A network edge device managing bandwidth to one or more users comprising:
a clock operable to determine a current time;
a bandwidth controller operable to determine whether the bandwidth available to a user is to be adjusted based on the current time and a profile, the bandwidth controller operable to issue a command to adjust the bandwidth in response to the determination;
an access circuit for adjusting the bandwidth available to the user through a connection in response to the command; and
cost logic operable to determine costs incurred by the user in response to the profile implemented by the bandwidth controller.

12. The network edge device according to claim 11, further comprising:
a memory for storing a plurality of profiles for the user including the profile, the profile includes one or more time periods during which the bandwidth is adjusted.

13. The network edge device according to claim 12, further comprising:
an interface operable to receive a selection of one of the plurality of profiles that meet bandwidth needs of the user, the selection specifying a time for implementation of the one of the plurality of profiles.

14. The network edge device according to claim 11, wherein the interface is operable to receive a selection through web portal.

15. The network edge device according to claim 12, wherein the cost logic displays a associated with the plurality of profiles, and wherein the cost logic bills a user for costs compiled during a time period based on implementation of each of the plurality of profiles.

16. A network device for managing bandwidth to a connection comprising:
a processor for executing a set of instructions; and
a memory in communication with the processor, the memory operable to store the set of instructions, the set of instructions are operable to:
receive a selection of a profile from a plurality of profiles, the profile being selected to allocate bandwidth to a user,
determine the selected profile for allocating bandwidth to the user through the connection;
allocate the bandwidth available to the connection in response to determining the selected profile provides for a bandwidth reconfiguration; and
track utilization of each of the plurality of profiles during a time period to bill the user for the bandwidth utilized during the time period.

17. The network device according to claim 16, wherein the profile specifies bandwidth increases and decreases for the bandwidth allocation, and wherein the profile includes one or more time periods during which the bandwidth is adjusted.

18. The network device according to claim 16, wherein the bandwidth is allocated according to two or more active profiles from the plurality of profiles during a twenty four hour period.

19. The network device according to claim 16, wherein the set of instructions is further operable to receive a selection of the profile or custom bandwidth selection through a portal, the selection specifying a time to implement the profile or the custom bandwidth selection.

20. The network device according to claim 16, wherein the selection of the profile or custom bandwidth selection is implemented in real-time in response to the selection including an indication to immediately implement the profile or custom bandwidth selections, and wherein the allocation of the bandwidth is performed by the network device for the connection, a device, or a network of the user.

* * * * *